United States Patent Office 3,349,755
Patented Oct. 31, 1967

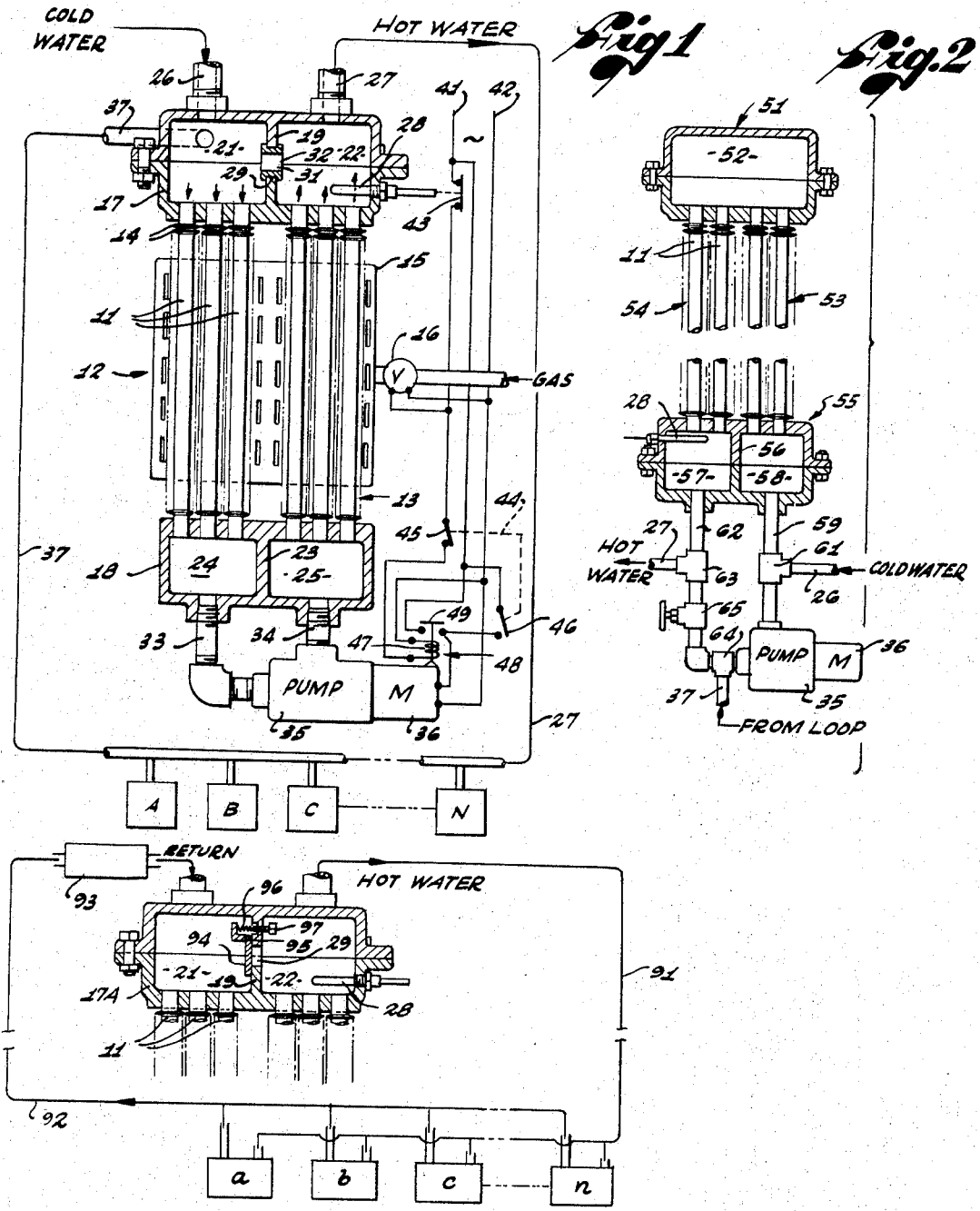

3,349,755
RECIRCULATING FLOW WATER HEATER
Avy L. Miller, 13246 Saticoy St., North
Hollywood, Calif. 90028
Filed Mar. 9, 1966, Ser. No. 532,955
20 Claims. (Cl. 122—406)

The present invention relates generally to water heaters and more particularly to water heaters of the instantaneous-type supplying hot water continuously or intermittently, without storage of the heated water.

In hot water heating and supply systems of the type described in my Patent No. 2,833,273 for Hot Water Storage Tank and Water Heater System Embodying the Same, granted May 6, 1958, hot water for example at 180° F., is stored in a relatively large capacity storage tank from which the water is supplied according to demand requirements, either at the 180° F. stored temperature, or tempered with cold water for manual consumption at 140° F., for example. The water in the storage tank is maintained at the desired high temperature by means of a water heater through which water is circulated from the tank through the heat exchange tubes of the heater. The heating capacity of the water heater or boiler may be substantially less than the rate at which hot water may be required and it is this limitation in the water heater which necessitates storage of the hot water at the desired supply temperature.

In the storage system just described, the volume of hot water which can be supplied in a given period will of course be limited not only by the size of the tank but also by possible mixing of the stored water with incoming cold water replacing that withdrawn from the tank. This reduces the volume of water available at the high temperature and results in large requirements being supplied at a temperature lower than that desired. Furthermore, the tank is costly and requires installation space and presents a large surface for heat loss from the stored water.

Where such storage systems supply a relatively long distribution loop they further make desirable some means for maintaining hot water within the loop at all times which may require an additional pump, venturi means or the like to secure circulation through the loop during periods of no or low consumption.

Previous attempts have been made to avoid storage of hot water and to supply hot water requirements, both domestically and commercially, by means of so-called instantaneous-type water heaters. Particularly in commercial installations of hotel, motel and restaurant types, such heaters have been expensive, erratic in operation, and susceptible to overheating at low consumption rates. These installations have attempted to overcome their inherent difficulties with expensive and complicated controls which have been prone to malfunctions, resulting in erratic operation and expensive servicing. In operation at low consumption rates, the slow response of controlling thermostats or the like resulted in serious overheating of the water in the heater, even to the extent of steam formation. Any incidental circulation by thermal or gravity flow had little effect on the slow response and overheating at low consumption rates.

The instantaneous-type water heater according to the present invention not only continuously supplies hot water at the desired temperature without storage, but includes very rapid thermostatic response even at low consumption rates to prevent overheating of the water within the heater. High velocity flow is maintained through the heat exchange tubes of the heater, regardless of the rate of consumption, which not only gives rapid sampling and quick response by the thermostatic control but also provides a self-cleaning action for the tubes to lessen the deposit of minerals on the interior tube surfaces which would otherwise decrease the capacity of the tubes and lower their thermal efficiency.

At the same time, the water heater according to the present invention maintains a difference in pressure across points in the heating loop which is sufficient to effect circulating flow through the distribution loop to maintain hot water continuously available throughout the loop, regardless of consumption, without auxiliary pumping or flow equipment.

The desired rate of recirculation through the heat exchange tubes of the heater may vary with the mineral content of the water supply since with soft water the self-cleaning action to lessen mineral deposits becomes unimportant and the recirculating flow need be only that desirable to provide for rapid sampling of the water temperature. A like condition exists in a closed system for zone space heating where the same water circulates between the water heater and the space heaters.

An additional feature of the water heater of the present invention is that condensate on the exterior of the heat exchange tubes at the heater inlet is substantially prevented even with a very cold water supply by mixing the cold water supply with heated water before it enters the heat exchange tubes.

It is therefore an object of the present invention to provide an improved, effective, reliable and inexpensive instantaneous-type water heater.

Another object of this invention is the provision of an improved water heater providing for recirculating flow of water through the heater to effect rapid sampling of the water temperature when flow from the heater is low.

Another object of this invention is the provision of an improved water heater capable of supplying hot water continuously at a relatively high rate of consumption at a desired high temperature without substantial storage of hot water, while preventing overheating of the water at low consumption rates.

Another object of this invention is the provision of a water heater having improved means for preventing condensate on the heat exchanger even with very cold inlet water temperatures.

Another object of this invention is the provision of an improved instantaneous-type water heater capable of continuously supplying hot water at a relatively high rate and at a desired temperature without storage, and providing for high velocity flow of water through the heat exchange tubes of the heater independent of the rate of hot water consumption from the heater.

A further object of the present invention is the provision of an instantaneous-type water heater providing forced recirculating flow of water through the heat exchanger of the water heater at a velocity many times that required to supply the water consumption from the heater to inhibit deposits on the surfaces of the heat exchanger and to provide for rapid sampling of the temperature of the water passing through the exchanger.

A still further object of the present invention is the provision of an improved instantaneous-type water heater having forced pumped flow of water at relatively high velocity through a recirculating loop including the heat exchanger of the heater, and thus providing for rapid sampling of the temperature of the water passing through the heat exchanger, and in which a pressure head is provided between the intake and return of a distribution loop to effect circulation of hot water therethrough independent of consumption of hot water from the distribution loop.

These and other objects and features of the invention will be apparent to those skilled in the art from the following specification and the appended drawing in which:

FIGURE 1 is a general diagrammatic representation of an instantaneous-type water heater and distribution system according to the present invention;

FIGURE 2 is a view of another embodiment of instantaneous-type water heater according to the present invention;

FIGURE 4 is a generally diagrammatic, partial representation of a space heating exemplification of this invention.

Figure 3:
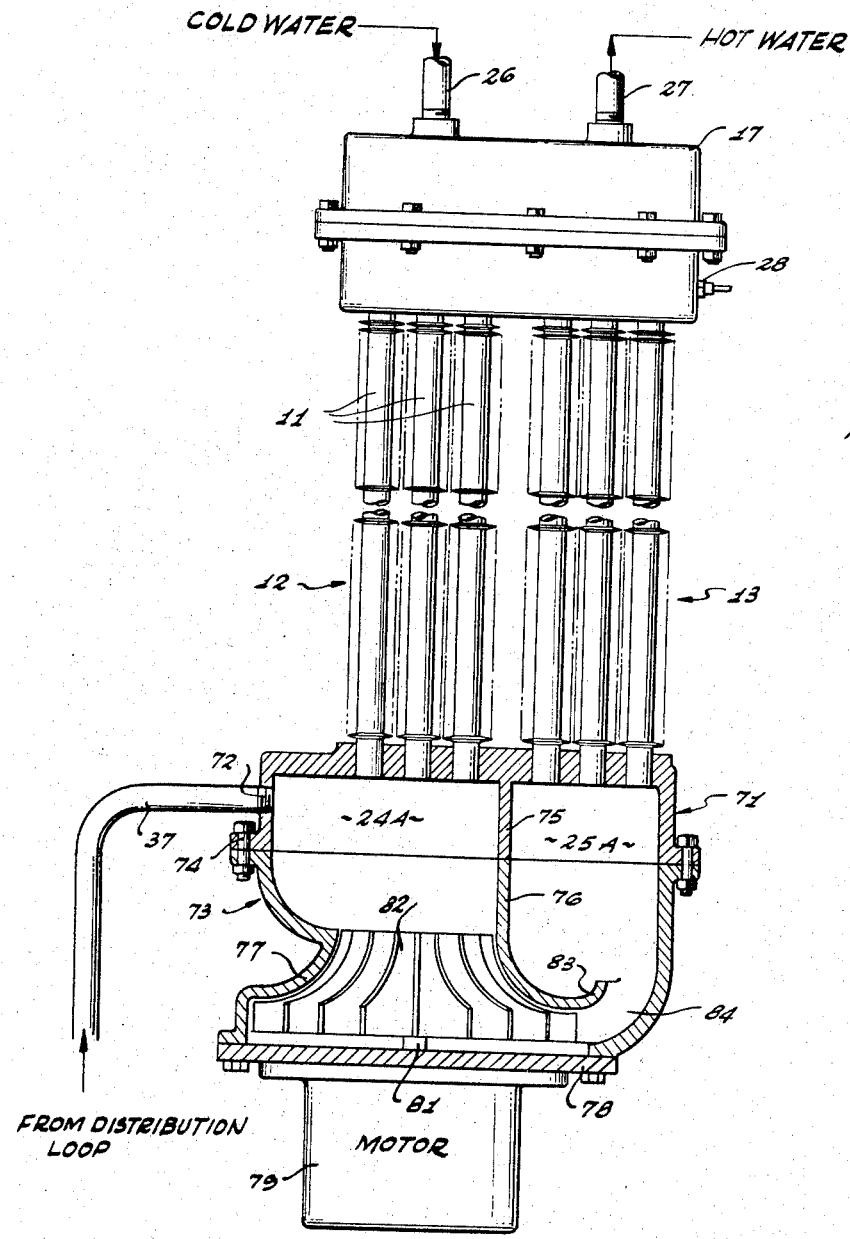
FIGURE 3 is a view of an instantaneous-type water heater embodiment similar to FIGURE 1 but with built-in features.

In the instantaneous-type water heaters according to the present invention illustrated in FIGURES 1-3, the heat exchangers have been somewhat diagrammatically illustrated as substantially horizontal tubes 11 arranged in rearward and forward flow sets 12 and 13, respectively. The tubes 11 may be provided with heat transfer fins such as shown and described in my Patent 2,828,723 granted April 1, 1958 for Continuous Flow Water Heater and the tubes 11 may be disposed within any desired type of heater enclosure such as shown in my aforesaid patents and likewise provided with burners 15 located beneath the heat exchange tubes 11 and controllably supplied with fuel, as by a solenoid valve 16. It will be understood that the water heater will have conventional regulating and safety devices, such as pressure regulators, safety pilots and the like as described in my Patent 2,828,723 and forming no part of the present invention.

The horizontal heating tubes 11 are shown in FIGURE 1 as extending between a forward manifold 17 and a rear manifold 18. The forward manifold 17 is divided by a center wall 19 into an inlet chamber 21 and an outlet chamber 22. The rear manifold 18 is divided by a wall 23 into a pair of separated chambers 24 and 25. The rearward flow set 12 has its tubes 11 interconnecting the intake chamber 21 and the chamber 24 and the forward flow set 13 has its tubes 11 interconnecting the rear manifold chamber 25 with the outlet chamber 22. The cold water supply is connected by a pipe 26 into the inlet chamber 21; hot water is supplied by pipe 27 from the outlet chamber 22. A thermostatic bulb 28 for a controlling thermostat is located in the outlet chamber 22 immediately adjacent the outlets of the tubes 11 in the forward flow set 13.

The wall 19 dividing the inlet and outlet chambers 21 and 22 has an opening 29 therethrough which communicates the inlet and outlet chamber. This opening may itself be designed and sized to form a calibrated metering orifice. However, to vary the size of this orifice while utilizing a common manifold construction, the opening 29 preferably provides a maximum desired size and is then reduced to a particular desired calibrated size by means of replaceable bushings 31 readily insertable in the opening 29 by separation of the parts of the manifold 17. The bushings 31 thereby provide calibrated openings 32 which determine the velocity or rate of flow in the recirculating loop through the water heater tubes 11 for a given capacity circulation pump.

As shown in FIGURE 1, the rear manifold chambers 24 and 25 are connected by short lengths of pipe 33 and 34 to the inlet and outlet respectively of a water circulating pump 35 driven by an electric motor 36. The pump 35 thereby circulates water through the heat exchange tubes 11 of the water heater from the inlet chamber 21 through the set of tubes 12 to the rear manifold chamber 24, thence through pump 35 to the rear manifold chamber 25 and forwardly through the set of tubes 13 to outlet chamber 22 and through the calibrated opening 32 back to the inlet chamber 21. It will be seen, and it is a principal feature of the present invention, that relatively high velocity recirculating flow occurs independent of withdrawal of hot water from the heater through the pipe 27, and that the thermostatic bulb 28 rapidly samples the temperature of the water in the heater regardless of the rate of consumption of water from the heater. The relatively high velociy flow past the bulb 28 also produces turbulence to facilitate sensing of the water temperature.

The hot water supply pipe 27 feeds to a plurality of consuming units A, B, C . . . N of any desired number and which may be washing appliances taking hot water at the relatively high temperature of 180° F., or consumer's units taking lower temperature water at 140° F. In the latter case, it will be understood that the water supplied to the consuming unit may be suitably tempered by admixture with cold water, as by a thermostatic mixing valve which is conventional and forms no part of the present invention. The hot water supply pipe 27 feeds to the utilizing appliances and has a return line 37 back to the inlet chamber 21. A sufficient head or pressure differential is maintained between the chambers 21 and 22 across the calibrated opening 32 so that there will be a slow circulation of hot water through the supply pipe 27 and return pipe 37 to maintain the water in the distribution loop and at the units A, B, C . . . N at the desired supply temperature and prevent stagnant water in the loop becoming tepid. It will be seen that this differential pressure is inherent in the high velocity recirculating water heater of this invention so that circulation through the distribution loop, without consumption by the units, occurs without additional equipment such as a distribution pump, venturi or the like.

To further explain applicant's new and inventive instantaneous-type water heater and system, the following numerical values are given as only exemplary of a system for supplying a given requirement and are not to be considered in any way limiting to the scope of the invention. In this exemplary installation there is assumed a maximum requirement of ten to twelve gallons of hot water per minute to be supplied by the water heater according to the present invention. From this maximum it will be understood that the hot water supplied from the heater may decrease down to only a very small fraction thereof where only a single tap might be only partially open. In the case of minimum consumption it would in a conventional water heater take a considerable time for sufficient water to flow through the heater for hot water to reach a thermostatic control, thus very probably resulting in overheating of the water since the water heater has the capacity for continuously supplying hot water at the maximum demand rate of ten to twelve gallons a minute. In the water heater according to the present invention, regardless of the rate of consumption of hot water from the heater, the pump 35 and the calibrated opening 32 will be constructed and sized to recirculate water through the water heater at high velocity, corresponding, for example, to a flow of sixty gallons per minute. Thus, while the hot water supplied by the water heater through the supply pipe 27 varies from none up to a maximum of ten to twelve gallons per minute, flow through the tubes 11 in the water heater will still be at a velocity producing a flow of substantially sixty gallons per minute. This means that the thermostatic bulb 28 will respond very quickly to the temperature of the water passing through the heat exchanger tubes because it is directly in the sixty gallon per minute recirculating flow and is further subjected to the turbulence of the high velocity resulting from this rate of flow. Certain empirical criteria may be followed in the design of the water heater according to the present invention, for example, to establish the velocity of the recirculating flow through the tubes 11 at substantially six to ten feet per second, depending on the hardness of the water and other variables; or a velocity and rate of flow through the tubes which, with normal flame at the burners 15, will produce a temperature rise of 20° F. as the water makes one circuit through the heater. This obviously requires that the water recirculate many times through the passes or sets of tubes 12 and 13 to raise cold water to the desired 180° F. at the outlet chamber 22. The heater may be designed to work to the higher of the two velocities and rates of flow dictated by the above criteria. While recirculation is occurring through the water heater passes, the head or pressure differential maintained between the chambers 21 and 22 by the loss through the opening 32 may be of the order, for example, of one lb. p.s.i. or a two to three feet head of water.

In operating the water heater according to the present invention, the pump 35 may run continuously or intermittently and in either case the burners 15 will be supplied with fuel only as required to raise the temperature of the water in the outlet chamber 22 to the setting of the thermostatic bulb 28. A simplified wiring diagram is shown in FIGURE 1 which optionally continuously or intermittently operates the pump, as desired. An electrical supply line is shown by the wires 41 and 42. The solenoid valve 16 controlling the flow of fuel to the burners 15 is connected to line 42 and to line 41 through the contacts 43 of the thermostat controlled by the bulb 28. The contacts 43 close when the temperature of the water in outlet chamber 22 is below the thermostat setting to call for heat from the burners 15, and the contacts 43 open when the thermostat is satisfied. A manual switch 44 having double throw contacts 45, 46 determines whether the pump 35 shall operate continuously or intermittently. When contact 46 is closed, the motor 36 is connected directly across the line 41, 42 and operates continuously. When contact 45 is closed and contact 46 is open, the operating coil 47 of a time delay relay 48 is connected in parallel with the solenoid valve 16 to be controlled by the thermostat contacts 43. The time delay relay 48 has contacts 49 which close immediately upon energization of the coil 47 and which open after a predetermined time delay after deenergization of the coil 47.

In the intermittent operation of the pump 35, the coil 47 is energized to energize the motor 36 at the same time that the solenoid valve 16 is energized. Thus, circulation through the water heater is initiated simultaneously with supply of heat from the burners 15 and the pump continues recirculating water at high velocity through the water heater passes while the burners remain on. When the thermostatic bulb 28 is satisfied by the rise in the temperature of the water in the outlet chamber 22, contacts 43 open to deenergize solenoid valve 16 and relay coil 47. The burner flame is now extinguished but the pump 35 continues to recirculate water through the water heater passes because of the preset time delay in the opening of the time delay relay 48. This permits the recirculating water to extract heat stored in the fire box and combustion chamber of the heater and prevents localized overheating within the heat exchange tubes. After a predetermined time delay, when the temperature of the combustion chamber will have been thus reduced, the relay 48 opens contacts 49 to deenergize the motor 36 and stop the recirculating pump.

The embodiment of FIGURE 1 provides for rapid response of the thermostatic bulb 28 to a demand for hot water even when the pump 35 is not operating, in an intermittent operation mode. In such a condition, when hot water is withdrawn through the pipe 27, cold water under supply pressure will immediately enter the chamber 22 from the chamber 21 through the opening 32, that is, in reverse to the direction of forced circulation through the water heater. This cold water will quickly lower the temperature in the chamber 22 and cause a quick response from the thermostat 28 to initiate flame at the burners 15 and start the pump 35 to effect recirculation of the water through the water heater loop. This obviously prevents a lag in the operation of the thermostat until cold water could otherwise flow through the heater to the thermostat to actuate it. This quick response and immediate initiation of combustion in the heater prevents a wide variation in the temperature of the water initially supplied from the heater and establishes a steady temperature condition without delay.

In the specific example given above, the pump 35 has sufficient capacity to provide ample head between the chambers 21 and 22 to secure the desired freshening flow through the distribution loop. Where the pump has a lower capacity and provides a slower recirculating flow, the desired head for the distribution loop may be secured by connecting the return pipe 37 to chamber 24 at the pump inlet. Such a connection is illustrated in the embodiment of FIGURE 3 where the distribution loop returns to the chamber 24A.

It will be seen that cold water entering inlet chamber 21 is immediately mixed with the recirculating heated water flowing into chamber 21 through the opening 32. The temperature of the water entering the heat exchange tubes 11 may thereby be elevated above the dew point of the combustion gases from the burner 15 and the formation of condensate on the exterior of the heat exchange tubes avoided. This can be accomplished even with very cold supply water by maintaining sufficient recirculating flow so that the temperature of the mixed water is always above the dew point of the combustion gases.

In the embodiment of the invention illustrated in FIGURE 1, the division of the rear manifold 18 into two separate chambers 24 and 25 permits the pump 35 to be located at the rear of the water heater and connected in the recirculating loop by means of short piping 33, 34. The embodiment shown in FIGURE 2 illustrates an adaptation of the invention to a water heater which may take a more conventional form and be, for example, of a construction similar to that used in storage type installations. In this embodiment the rear manifold 51 has a single chamber 52 into which are connected both the rearward and forward flow passes 53, 54, these passes being formed by pairs of heat exchange tubes 11 previously described. The forward manifold 55 is divided by a central wall 56 into separate outlet and inlet chambers 57 and 58. The same thermostatic bulb 28 is located in the outlet chamber 57 adjacent the outlets of the heat exchange tubes forming the forward pass 54. The pump 35 and motor 36 are as previously described and may be likewise controlled by the wiring diagram of FIGURE 1.

The inlet chamber 58 is connected to the outlet of pump 35 by piping 59 through a T fitting 61 into which is connected the cold water supply pipe 26. The outlet chamber 57 of the water heater is connected by piping 62 through fittings 63 and 64 and a valve 65 to the inlet to pump 35. The hot water supply pipe 27 is connected into the fitting 63 and the return pipe 37 for the distribution loop is connected into the fitting 64. The valve 65 provides a variable calibrated opening between the inlet and outlet chambers 58 and 57 corresponding in function to the calibrated opening 32 in FIGURE 1.

The operation of the embodiment of the invention shown in FIGURE 2 is the same as that described for the embodiment of FIGURE 1 with the pump 35 providing high velocity flow of water through the loop which includes the pump, the piping 59, the inlet chamber 58, the rearward flowing pass 53, the rear manifold chamber 52, the forward flowing pass 54, the outlet chamber 57, and piping 62 to the pump inlet. As before, this high velocity recirculation flow is many times the velocity of flow through the heater which would supply the maximum requirement for hot water therefrom. The velocity and flow rate examples given for the embodiment of FIGURE 1 can be used as well for the operation of the embodiment of FIGURE 2. The drop through the valve 65 will provide a sufficient pressure difference or head to secure the desired freshening circulation through the distribution loop through pipe 27, returning at 37 to the pump and the inlet chamber 58.

The operation of the pump 35 in FIGURE 2 may be continuous or intermittent, as described for the embodiment of FIGURE 1, and it will be understood that the heater will include the usual firebox, enclosure, and control and safety components of ordinary heater constructions, as in my patents previously identified.

It will further be understood that the embodiment of FIGURE 1 may be modified to place the calibrated opening 32 outside the manifold 17 in outside piping or the like intercommunicating the inlet pipe 26 and supply pipe 27, similarly to FIGURE 2 but with pump 55 remaining at the rear; the wall 19 would then be imperforate.

FIGURE 3 illustrates a further embodiment of an instantaneous-type water heater according to the present invention similar to FIGURE 1 in employing the same forward manifold 17, the same heat exchange passes 12 and 13, the same manner of operation and the same firebox and accessory equipment, but a different rear manifold 71. The manifold 71 is of two sections 72, 73 bolted together at 74 and having mating walls 75 and 76 dividing the manifold 71 into a pair of chambers 24A and 25A conforming generally in function to the chambers 24 and 25 in FIGURE 1. The rear of the manifold chamber 24A opens directly into a pump chamber 77 formed between a wall of the manifold section 73 and the wall 76 interiorly thereof. The rear of the pump chamber 77 is closed by a plate 78 which is bolted to the rear of the manifold section 73.

Upon the plate 78 is rigidly mounted an electric motor 79 having a shaft 81 extending through the plate 78 and supporting on its end a pump impeller 82 disposed in the chamber 77. The plate 78, the motor 79 and the impeller 82 form a unit which may be bodily removed as such from the manifold for service and replacement. The interior wall 76 in the manifold section 73 curves as shown at 83 to form between itself and the adjacent interior wall of the manifold section 73, a volute 84 forming the outlet from the pump into the rear manifold chamber 25A. The high velocity recirculation in the embodiment of FIGURE 3 flows from the inlet chamber through the rearward flow pass 12, the rear manifold chamber 24A, pump chamber 77, volute 84, rear manifold chamber 25A, forward flow pass 13 to the outlet chamber in forward manifold 17 and thence through the opening 32 into the inlet chamber. The embodiment of FIGURE 3 is particularly advantageous in supplying a recirculating system for the water heater which does not require any exterior plumbing and thus avoids the loss therethrough. The motor and recirculating pump become, in effect, a part of the water heater itself which is supplied by the heater manufacturer. This avoids installation costs and the possibility of plumbing errors.

While the instantaneous type of water heater of the present invention has been described and will ordinarily preferably be used without any tank for hot water storage, it is conceivable that installations will occur where a small tank might be desired to act somewhat as a thermal surge reservoir to prevent large overshoots. It is to be considered within the scope of this invention that such small tanks may be used, if desired, although it is clear that they ordinarily will not be necessary for efficient and satisfactory operation of the water heater and system. Such a thermal surge reservoir might have a capacity of the order of thirty gallons or even smaller, as distinguished from a three hundred or even greater capacity tank for conventional storage.

While this invention has its primary application in the supply of hot water for consumption, the high velocity recirculating feature thereof at low consumption may also prove desirable in closed-system, space heating applications and an exemplification thereof is illustrated in FIGURE 4 including a water heater of the general type shown in either FIGURE 1 or FIGURE 3, utilizing the rear manifold and pump, the heating tubes 11 and a front manifold 17A providing the pair of chambers 21 and 22 separated by the wall 19 with an intercommunicating opening 29. The space heaters are indicated at a, b, c . . . n and hot water is fed thereto from the chamber 22 by the hot water line 91 and the cool water from which heat has been extracted is returned to the heater through the return line 92 into heater inlet chamber 21. This space heating system will include a hydro-pneumatic tank or the like, indicated diagrammatically at 93, and conventional air bleed off and water replenishing components. The space heating system of FIGURE 4 is a closed system in which supply water pressure is not available to secure flow through the units as it is through the consuming units in the instantaneous type water heater applications of FIGURES 1–3. Therefore, the pump 35 or 82 in this application effects the main circulation through the heating loop.

Since the space heating system employs a closed loop where fresh water is not being constantly added, as in the consumption system, the problem of liming or other mineral deposits on the interior of the heating tubes is not present and recirculation is needed only to provide for quick sampling of the temperature of the water passing through the heater. Therefore, the opening 29 can be made much smaller or the circulating pump be of lower capacity, resulting in slower recirculating flow through the system of FIGURE 4 than in the consuming systems where mineral deposit is an important detriment and much higher velocity of flow is desired to provide a self-cleaning action as well as rapid water temperature sampling.

In the application of FIGURE 4 the pump which circulates the water to and from the space heaters may have only sufficient capacity to supply all of the space heaters when all are demanding hot water flow therethrough. To prevent loss by recirculation during this condition where full pump capacity flow through the pipes 91, 92 is required, there is provided a valve flap closure 94 for the opening 29. The flap 94 is pivoted at 95 and spring-biased toward closed position by a spring 96 adjustable by a screw 97 to regulate the pressure differential between chambers 21 and 22 at which flow through the opening 29 will occur. Gravity or other biasing force may replace the spring 96.

For a specific example, given without limitation to the scope of the invention, assume four offices or other spaces being heated by the units a, b, c . . . n and with the water flow through each space heater rated at a normal ten gallons per minute. When all of the space thermostats are satisfied and no water is being passed through the space heaters it is still desired to bypass or recirculate water at the order of approximately five gallons per minute through the opening 29 and the heating tubes 11 to provide for rapid sampling of the water temperature at the thermostatic element 28. If we assume a circulating pump with a capacity only sufficient to supply the maximum demand of forty gallons per minute when all the spaces are requiring heat, it is desirable that no capacity be lost by flow through the opening 29 under this maximum demand condition. At this time the pressure differential between chambers 22 and 21 is low so that flap 94 closes under the bias thereon and all of the water being pumped will circulate through the pipes 91 and 92 to and from the space heating units. When no water is being passed through the space heaters, the restricted size of opening 29 limits the flow therethrough to substantially five gallons per minute, the maximum capacity of the pump being reduced by the restricting head against which it pumps. It will be understood that in this system the space heating units a, b, c . . . n will be individually thermostatically controlled to regulate flow of water therethrough from the hot water supply pipe 91 as called for by the temperature of the spaces individually heated by the individual units.

While certain preferred embodiments of this invention have been specifically illustrated and described it will be understood that the invention is not limited thereto as many variations will be apparent to those skilled in the art and the invention is to be given its broadest interpretation within the terms of the following claims.

I claim:

1. In a water heater: forward and rear manifolds; heat exchange means interconnecting said manifolds and providing for the flow of water to be heated therethrough; a water inlet to said heat exchange means supplying cold water to a manifold; a hot water consumption outlet from said heat exchange means withdrawing heated water from a manifold; means for selectively supplying heat to said heat exchange means to heat the water flowing therethrough; and means for forcibly circulating water through said manifolds and heat exchange means at a rate of flow substantially higher than the rate of flow through said hot water consumption outlet to provide for rapid sampling of the temperature of the water in the heater.

2. The water heater defined in claim 1 in which said circulating means provides a circulating rate of flow several times that of the rate of hot water withdrawal even at maximum demand and continues a high circulating rate of flow while no hot water is being withdrawn.

3. The water heater defined in claim 1 in which said forward manifold is divided into inlet and outlet chambers so that the water flowing from the heater passes from the inlet chamber in the forward manifold to the rear manifold and thence to the outlet chamber in the forward manifold, said water inlet being connected to said inlet chamber and said hot water outlet being connected to said outlet chamber; thermostatic means in said outlet chamber to be responsive to the temperature of the water therein; and a calibrated opening intercommunicating said inlet and outlet chambers through which said higher flow rate occurs.

4. The water heater defined in claim 3 including means dividing said rear manifold into a pair of chambers; and pump means interconnecting said rear manifold chambers to produce forced circulation about a loop including said manifold chambers, heat exchange means and pump.

5. The water heater defined in claim 1 in which said forward manifold is divided into a pair of discrete chambers while said rear manifold provides a single chamber; pump means interconnecting said forward manifold chambers to effect the higher flow rate circulation through the manifolds and heat exchange means in a closed loop, said water inlet being connected into the loop on the outlet side of the pump and said hot water outlet being connected to the loop on the inlet side of the pump.

6. The water heater defined in claim 5 including: a metering opening connetced between the hot water outlet and the outlet from the pump; and means for connecting a consumer distribution loop return line into the water heater circulating loop between said metering opening and the inlet to said pump.

7. The water heater defined in claim 3 including: means for connecting the return line of a consumer distribution loop to the inlet to said water heater whereby the differential pressure across said outlet and inlet chambers effects automatic freshening circulation of hot water through the loop to prevent stagnant tepid water existing therein.

8. The water heater defined in claim 3 including: means including said rear manifold defining a pump chamber connected in the loop in which the circulating water flows; a pump impeller in said chamber; and means for driving said impeller.

9. The water heater defined in claim 3 including: means in said rear manifold substantially dividing it into a pair of chambers into which said heat exchange means are connetced; means including the rear manifold wall and said dividing means providing a pump chamber forming an integral part of said rear manifold; means including said dividing means and the rear manifold wall providing an outlet from said pump chamber into the other of said rear manifold chambers, the first of said rear manifold chambers and the pump chamber directly intercommunicating; and means removably mounted on said rear manifold and forming a part of the enclosure therefor, said last-mentioned means supporting a pump impeller within said pump chamber; and driving means for said pump impeller.

10. The water heater defined in claim 3 including: means for closing said calibrated opening to prevent circulating flow therethrough, said last-mentioned means being biased toward opening-closing position.

11. In a water heater for raising the temperature of water to a desired hot consumption temperature: heat exchange tubes through which the water to be heated flows; fuel burners beneath said tubes for selectively flowing products of combustion thereover to heat the water therein; means connecting said heat exchange tubes into a continuous, water-recirculating loop; an inlet for cold water into said loop; an outlet for hot water consumption from said loop; thermostatic means for selectively controlling the supply of fuel to said burners and the combustion heat supplied thereby; and means for forcibly circulating the water through said heat exchange tubes in said recirculating loop at a rate of flow substantially higher than the rate of flow from said hot water consumption outlet.

12. The water heater defined in claim 11 in which said heat exchange tubes are disposed substantially parallel and horizontally with their ends adjacent the front and back of the heater and in which the ends of said tubes are interconnected to flow water therethrough in said continuous, recirculating loop both rearwardly and forwardly of the heater.

13. The water heater defined in claim 11 in which said thermostatic means is responsive to the temperature of the water substantially adjacent the point of maximum temperature within the recirculating loop; a pump constituting the means for forcibly circulating the water through the loop; and means responsive to said thermostatic means when the temperature to which it is responsive falls below a predetermined value for substantially simultaneously supplying fuel to said burners and effecting operation of said pump.

14. The water heater defined in claim 11 in which said thermostatic means in responsive to the temperature of the water substantially adjacent the point of maximum temperature within said recirculating loop; a pump constituting the means for forcibly circulating the water through the loop; means for continuously energizing said pump independent of said thermostatic means; and means responsive to said thermostatic means when the temperature to which it is responsive falls below a predetermined value for initiating supply of fuel to said burners.

15. The water heater defined in claim 13 including: means for selectively connecting said pump for continuous operation and continuous circulation of water through the recirculating loop independent of said thermostatic means and its supply of fuel to said burners.

16. The water heater defined in claim 11 including: a closed heating system; a plurality of independently controlled space heaters in said system; means connecting said hot water outlet to the hot water line of the system; and means connecting the return line of the system to said water inlet.

17. In a water heater for raising the temperature of water to a desired hot consumption temperature: heat exchange tubes providing for the flow therethrough of water to be heated; an external water inlet to said heat exchange tubes; an external hot water outlet from said heat exchange tubes; means for selectively supplying heat to said heat exchange tubes to heat the water therein; means providing a water recirculating loop including a continuous water passage through said external water inlet, heat exchange tubes and external hot water outlet; and means for forcing water through said recirculating loop at a relatively high velocity substantially independent of the rate of consumption of hot water from said water heater.

18. The water heater defined in claim 17 including: a hot water consumption distribution loop connected with said hot water outlet and said recirculating loop; and means for circulating water through said distribution loop.

19. The water heater defined in claim 17 in which said means providing a recirculating loop includes an external water passage connection between said external water inlet and said external hot water outlet and an external pump in said external connection operating to force water therethrough from the hot water outlet to the water inlet.

20. The water heater defined in claim 19 including: a hot water consumption distribution loop connected between the hot water outlet and the inlet side of said pump; and means for effecting circulation of hot water through said distribution loop in the direction from the hot water outlet toward the pump inlet.

References Cited
UNITED STATES PATENTS

| | | | |
|---|---|---|---|
| 1,579,773 | 4/1926 | Losel | 122—406 |
| 1,606,108 | 11/1926 | Sklar | 237—56 |
| 2,232,013 | 2/1941 | Rutherford | 126—350 |
| 2,800,307 | 7/1957 | Putney | 165—108 |
| 2,833,273 | 5/1958 | Miller | 126—362 |
| 2,879,749 | 3/1959 | Lewy | 165—108 X |
| 2,889,116 | 6/1959 | MacCracken et al. | 237—8 |
| 3,046,955 | 7/1962 | Rossi | 122—406 |

ROBERT A. DUA, *Examiner.*

MARTIN P. SCHWADRON, *Primary Examiner.*